United States Patent
Habisreitinger

(10) Patent No.: US 8,250,743 B2
(45) Date of Patent: *Aug. 28, 2012

(54) PROCESSING SYSTEM FOR A MOVING WORKPIECE AND METHOD OF POSITIONING THE PROCESSING SYSTEM

(75) Inventor: Uwe Habisreitinger, Lossburg (DE)

(73) Assignee: Daimler AG, Stuttgart (DE)

( * ) Notice: Subject to any disclaimer, the term of this patent is extended or adjusted under 35 U.S.C. 154(b) by 895 days.

This patent is subject to a terminal disclaimer.

(21) Appl. No.: 12/303,279

(22) PCT Filed: Feb. 14, 2007

(86) PCT No.: PCT/EP2007/001263
§ 371 (c)(1),
(2), (4) Date: Dec. 12, 2008

(87) PCT Pub. No.: WO2007/140828
PCT Pub. Date: Dec. 13, 2007

(65) Prior Publication Data
US 2009/0226292 A1  Sep. 10, 2009

(30) Foreign Application Priority Data
Jun. 3, 2006 (DE) .......................... 10 2006 026 132

(51) Int. Cl.
*B23P 19/00* (2006.01)
(52) U.S. Cl. ............. 29/822; 29/281.1; 29/559; 29/823; 29/824; 901/6; 901/7
(58) Field of Classification Search .................... 29/559, 29/822, 823, 824, 280.1; 901/6, 7
See application file for complete search history.

(56) References Cited

U.S. PATENT DOCUMENTS

| | | | |
|---|---|---|---|
| 3,283,918 A | 11/1966 | Devol | |
| 4,311,058 A | 1/1982 | Lundgren | |
| 4,589,184 A | 5/1986 | Asano et al. | |
| 4,700,472 A | * 10/1987 | Muranaka | ........................ 29/822 |
| 5,548,096 A | * 8/1996 | Akasaka et al. | ............ 219/117.1 |

FOREIGN PATENT DOCUMENTS

| | | |
|---|---|---|
| DE | 10313463 B3 | 4/2004 |
| EP | 0348604 A1 | 1/1990 |
| JP | 8141945 A | 6/1996 |

* cited by examiner

*Primary Examiner* — Derris Banks
*Assistant Examiner* — Azm Parvez
(74) *Attorney, Agent, or Firm* — Patent Central LLC; Stephen A. Pendorf

(57) ABSTRACT

The processing system (10) serves for processing a moving workpiece (12) by means of an industrial robot (16) that can be rigidly coupled, intermittently, to the workpiece (12) and/or to a movable workpiece carrier unit (14), the industrial robot (16), when in a decoupled operating position (42), being carried by a carrier device (18) that is movable, independently of a workpiece, by means of a drive unit (20) acting with active drive, and, when in a coupled operating position (44), being floatingly mounted relative to the carrier device (18) by means of a floating bearing system (22).

Figure 3:
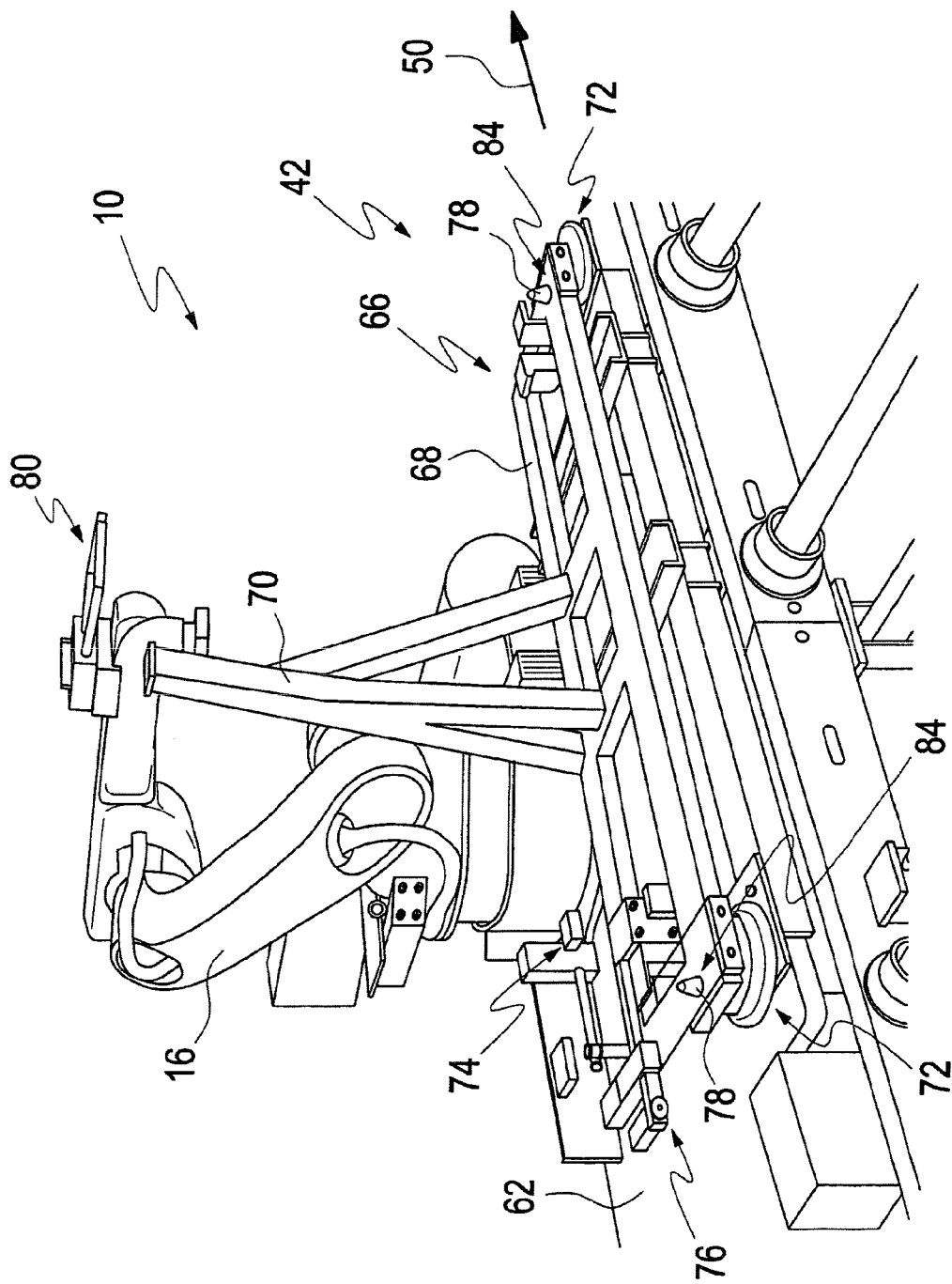

Provision is made in this case whereby, in a coupled operating position (44) of the industrial robot (16), the drive unit (20) does not act with active drive upon the carrier device (18), the carrier device (18) being moved concomitantly, at least intermittently, by the moving workpiece (12) and/or by the moving workpiece carrier unit (14), by means of the floating bearing system (22), when the industrial robot (16) has been coupled.

Further provided is a positioning method for an industrial robot (16) of such a processing system (10), which industrial robot (16) can be coupled to a moving workpiece (12).

21 Claims, 6 Drawing Sheets

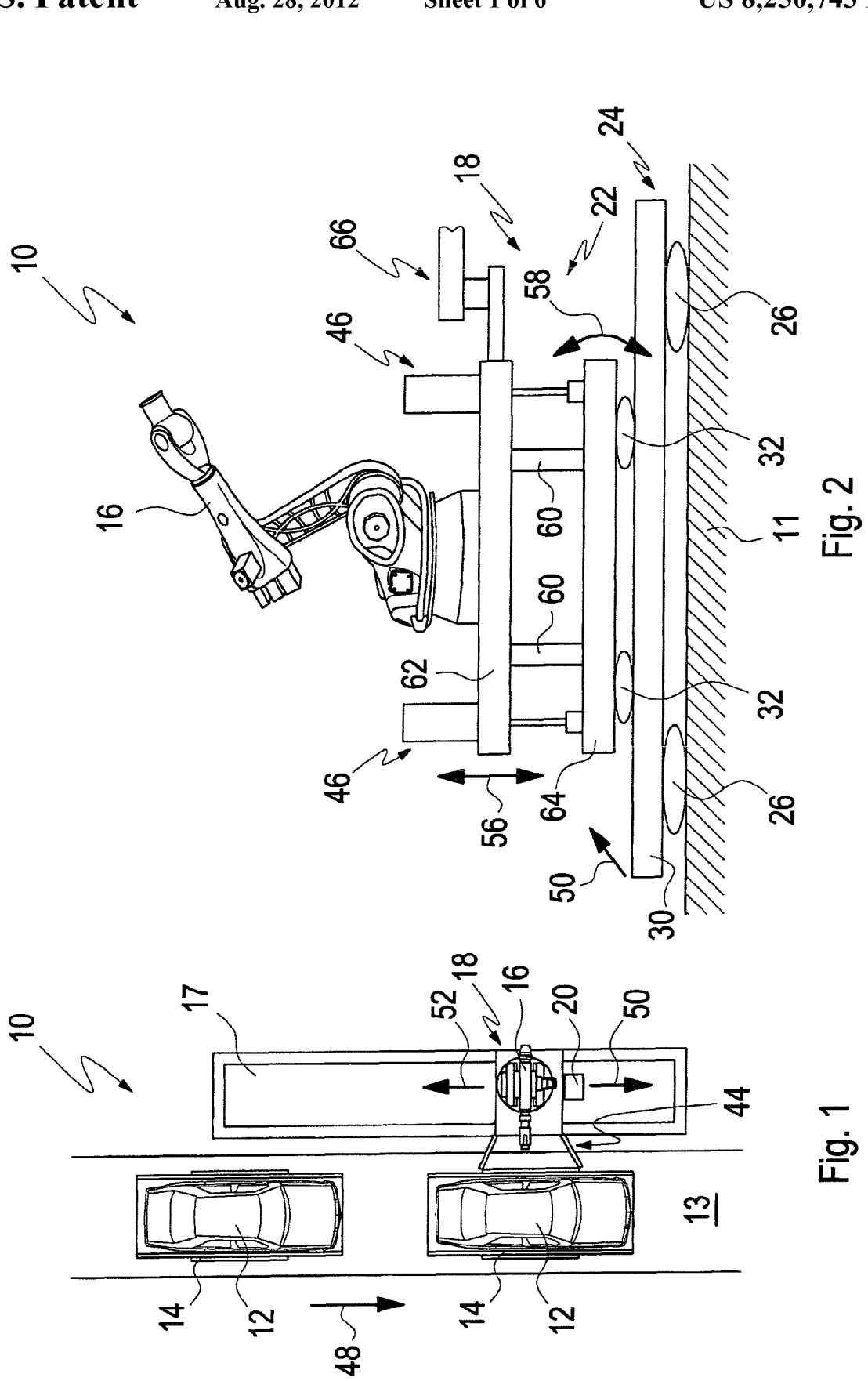

PROCESSING SYSTEM FOR A MOVING WORKPIECE AND METHOD OF POSITIONING THE PROCESSING SYSTEM

The invention relates to a processing system for processing a moving workpiece by means of an industrial robot that can be rigidly coupled, intermittently, to the workpiece and/or to a moving workpiece carrier unit, the industrial robot, when in a decoupled operating position, being carried by a carrier device that is movable, independently of a workpiece, by means of a drive unit acting with active drive, and, when in a coupled operating position, being floatingly mounted relative to the carrier device by means of a floating bearing system, according to the preamble of claim 1.

Further, the invention relates to a method for positioning an industrial robot of a processing system of the type stated at the outset, which industrial robot can be rigidly coupled, intermittently, to a movable workpiece and/or to a movable workpiece carrier unit, the processing system having a carrier device that is movable, independently of a workpiece, by means of a drive unit and that carries the industrial robot in the decoupled operating state, according to the preamble of claim 17.

Processing systems and methods of the type stated at the outset are known in the art. For example, DE 103 13 463 B3 discloses a method and a device for performing a work operation on a moving workpiece by means of an industrial robot moved concomitantly in synchronism. The concomitantly moved industrial robot is advanced during the entire work phase, i.e. in a state of being coupled to the workpiece, on average at the speed of the conveying device moving the workpiece. For this purpose, the speed of conveyance measured at the conveying device is input as a setpoint speed to a speed regulator, and impressed on the drive of a subframe of the industrial robot.

It is an object of the invention to provide an alternative processing system of the type stated at the outset. Further, it is an object of the invention to propose an alternative method of the type stated at the outset.

The object is achieved by a processing system having the features of claim 1. The processing system according to the invention is distinguished in that, in a coupled operating position of the industrial robot, the work unit does not act with active drive upon the carrier device and the carrier device is moved concomitantly, at least intermittently, by the moving workpiece and/or by the moving workpiece carrier unit, by means of the floating bearing system.

In this case, an "industrial robot that can be coupled" is understood to be an industrial robot that, in respect of its base—or its carrier unit—can be coupled to a workpiece, the work movements of the industrial robot being able to be effected irrespective of the coupling system used. The processing system according to the invention therefore includes a drive unit that is independent of a workpiece, for moving the decoupled industrial robot independently of a workpiece. When the industrial robot is coupled to the moving workpiece and/or to the moving workpiece carrier unit, the carrier device is dragged concomitantly, by means of the interposed floating bearing system, by the industrial robot now being moved concomitantly with the moving workpiece. In this coupled operating position of the industrial robot, therefore, the drive unit does not act with active drive upon the carrier device, and thus upon the industrial robot. This processing system is advantageous, since there is no longer a need for elaborate feedback control systems for adaptation of the movement of the industrial robot relative to the moving workpiece. The workpiece can be, for example, a vehicle body shell, or also other workpieces, in particular those to be produced or fitted in the context of series production.

Advantageously, the carrier device has a floating carrier unit for moving the industrial robot with reduced friction. The floating carrier unit in this case can be realized as an air cushion unit. The movement of the carrier device with reduced friction renders possible, in a coupled operating position, an undisturbed, reproducibly precise dragging operation of the industrial robot concomitantly moving the carrier device.

According to a preferred embodiment, the drive unit is realized as a friction wheel system, in particular a friction wheel system that can be activated and that includes at least one friction wheel, which is connected or connectable to a guidance system provided for the carrier device. The guidance system can be, for example, one or more guide rails, which can be mounted with relative ease in a workshop operation. A friction wheel system is particularly suitable for the defined moving, or displacing, of the carrier device, which can be moved on the sub-floor with reduced friction by means of the floating carrier unit, or the air cushion unit. The movement in this case is a movement whose position is defined by the guidance system.

The carrier device can have a platform, to which the industrial robot is rigidly connected when in a decoupled operating position and is floatingly connected when in a coupled operating position. The industrial robot can thereby be connected to the platform in a positionally defined manner when in a decoupled operating position, whereas it is arranged floatingly relative to the platform when in a coupled operating position, such that no disturbing forces (possibly reaction forces) can be transferred from the platform to the workpiece coupled to the industrial robot. In each operating position of the industrial robot, therefore, a connection (rigid or floating) between the industrial robot and the carrier device is ensured that is favorable in respect of positioning, or processing.

The industrial robot is connected to the platform preferably via an interposed, in particular switchable, height compensation system. The height compensation system serves to compensate, in as self-acting a manner as possible, possibly occurring tolerances of the coupled industrial robot in the Z direction (height direction) relative to the platform. Such height tolerances can occur, for example, because of the floating movement of the carrier device or because of positional inaccuracies in the case of the moving workpiece.

According to a possible embodiment variant, the platform can be carried by the floating carrier unit with reduced motional force. A platform is particularly well-suited to the realization of movement on the sub-floor with reduced friction, in particular by means of an air-cushion unit, and further renders possible a flexible arrangement of a floatingly mounted industrial robot having a switchable height compensation system as well as, possibly, further functional devices for workpiece processing. In this case, in a coupled operating position, the industrial robot can be floatingly connected to the platform by means of an air cushion system. In a decoupled operating position, by contrast, the industrial robot, with the floating bearing deactivated, can be connected rigidly, and thereby in a positionally defined manner, to the platform.

Advantageously, the industrial robot has a weight compensation unit, which, in dependence on a movement of the industrial robot, can be brought into an appropriate compensating position, in particular through a relocating movement, by means of a control unit of the industrial robot. The weight compensation unit can include, for example, appropriately relocatable or movable weight elements, the motion-controlled arrangement of which, in dependence on the movements of the industrial robot, enables a weight compensation to be achieved. This is particularly advantageous, since, when in the coupled operating state, the industrial robot is mounted floatingly relative to the platform, and is also always held in equilibrium by means of the weight compensation unit during movements. As an alternative to the relocation of weight elements, a weight compensation can also be achieved by means of a piston/cylinder system, which is supported on the platform and is connected to the industrial robot, and which likewise must be appropriately activated, or positioned, by means of a control unit in dependence on the movements of the industrial robot. Further, additional shock absorbers may possibly also be provided, which connect a boom of the industrial robot to the platform, such that unwanted twisting motions of the industrial robot system, resulting from acceleration effects, can be prevented.

A control unit of the industrial robot and/or at least one production unit can be additionally arranged on the carrier device and in particular on the platform. The production unit in this case can be a further industrial robot and/or a load carrier and/or a processing unit or another functional unit. Further, the production unit can be realized as an exchangeable and/or expandable module. Moreover, the carrier unit, and in particular the platform, can be realized as an exchangeable and/or expandable module. Such a processing system is particularly suitable for performing complex and/or dissimilar processing tasks in the context of series production or series assembly.

The processing system preferably includes a coupling device, which is coupled to the industrial robot by means of a floating bearing unit that can be activated. Further, in the coupled operating position, the coupling device can be connected to the industrial robot in a motionally rigid manner and, in the decoupled operating position, be floatingly connected thereto. In this case, the connection of the coupling device to the industrial robot can be realized directly on the industrial robot, or also indirectly, via a plate of the carrier device, on the industrial robot side. Owing to the switchable, floating mounting of the coupling device relative to the industrial robot, it is possible for the coupling device to be connected gently to the workpiece, or to the workpiece carrier unit, since, during the coupling operation, owing to the activated floating mounting of the coupling device relative to the industrial robot, the weight of the industrial robot does not have a disturbing or harming effect upon the workpiece.

According to a preferred embodiment, the coupling device has a connection system for effecting a connection to the moving workpiece carrier unit and has a gripping system for effecting a connection to the moving workpiece. Such a combined, and in particular rigid, connection of the coupling device to the workpiece carrier unit and to the workpiece makes it possible to effect a particularly gentle connection of the coupling device to the workpiece to be processed.

Further, the object is achieved by a method having the features of claim 17. The method according to the invention is distinguished in that, in the coupled operating state, the industrial robot moved concomitantly by the moving workpiece moves the carrier device concomitantly, at least intermittently, by means of a floating bearing system, the carrier device being movable on the sub-floor with reduced motional friction by means of a floating carrier unit. The advantages mentioned above in relation to the processing system can be achieved by means of the method.

The floating bearing system can be realized as an air cushion system and the floating carrier unit can be realized as an air cushion unit. Further, the carrier device can be movable in a directionally defined manner on the sub-floor by means of a guidance system. Such a processing system can be operated with particular ease of handling.

According to a preferred embodiment variant, the industrial robot is rigidly connected to the carrier device, the carrier device is then moved in a coupling position relative to the workpiece, a coupling device that is floatingly connected to the industrial robot is then coupled to the workpiece and/or to the workpiece carrier unit, the industrial robot is then floatingly connected to the carrier unit, the coupled coupling device is then rigidly connected to the industrial robot and, upon a workpiece movement, the carrier device is then moved concomitantly by means of the floating bearing system of the industrial robot. In this case, the workpiece can be moved at the instant of coupling of the coupling device. It is thus possible for a workpiece, moving continuously, to be processed by means of the industrial robot, by means of the processing system, in a coupled operating position. If appropriate, the workpiece can also be put in motion only after the coupled operating position has been effected.

Further advantages of the invention are disclosed by the description.

Figure 4:
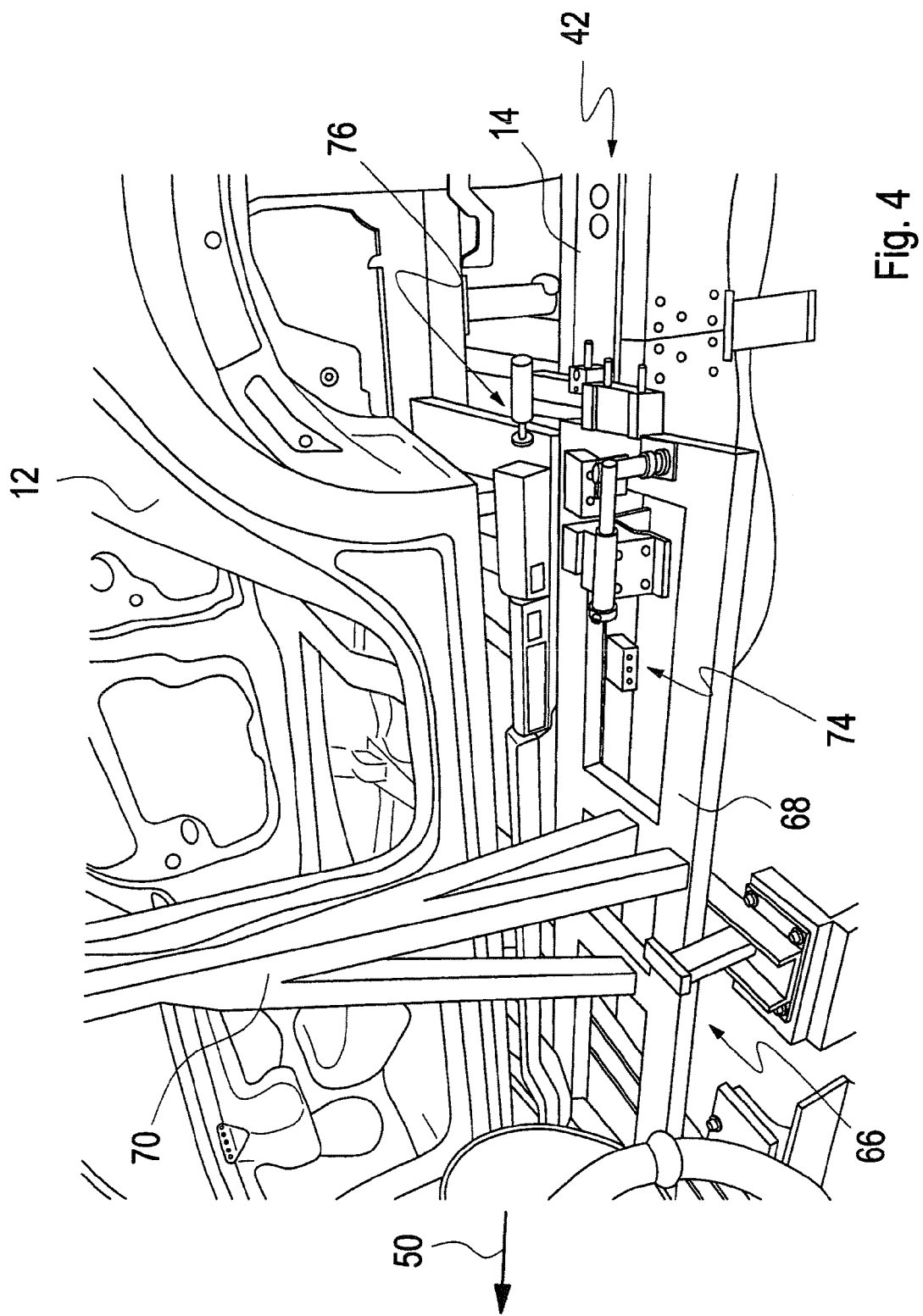
Figure 5:
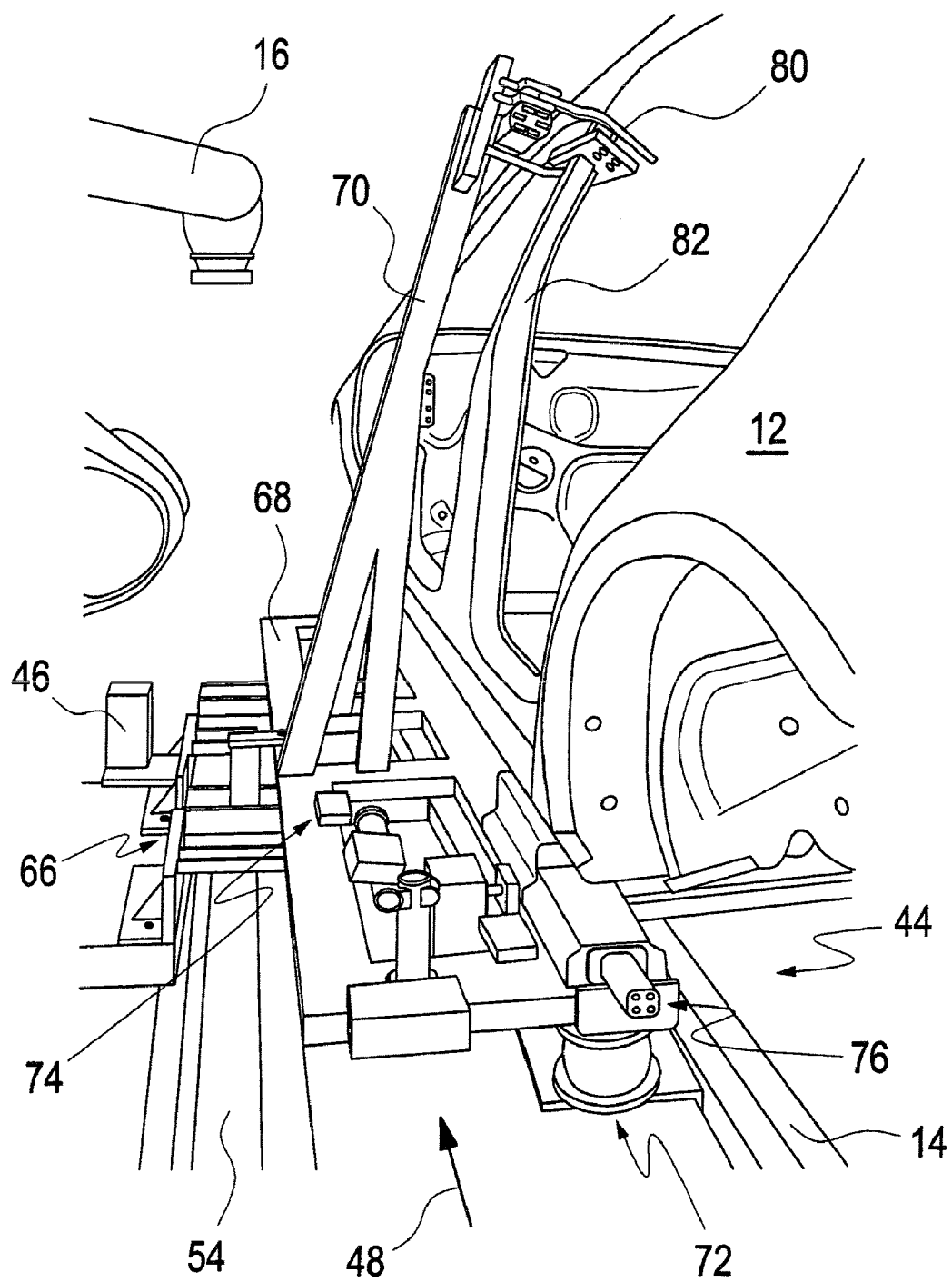
Figure 6:
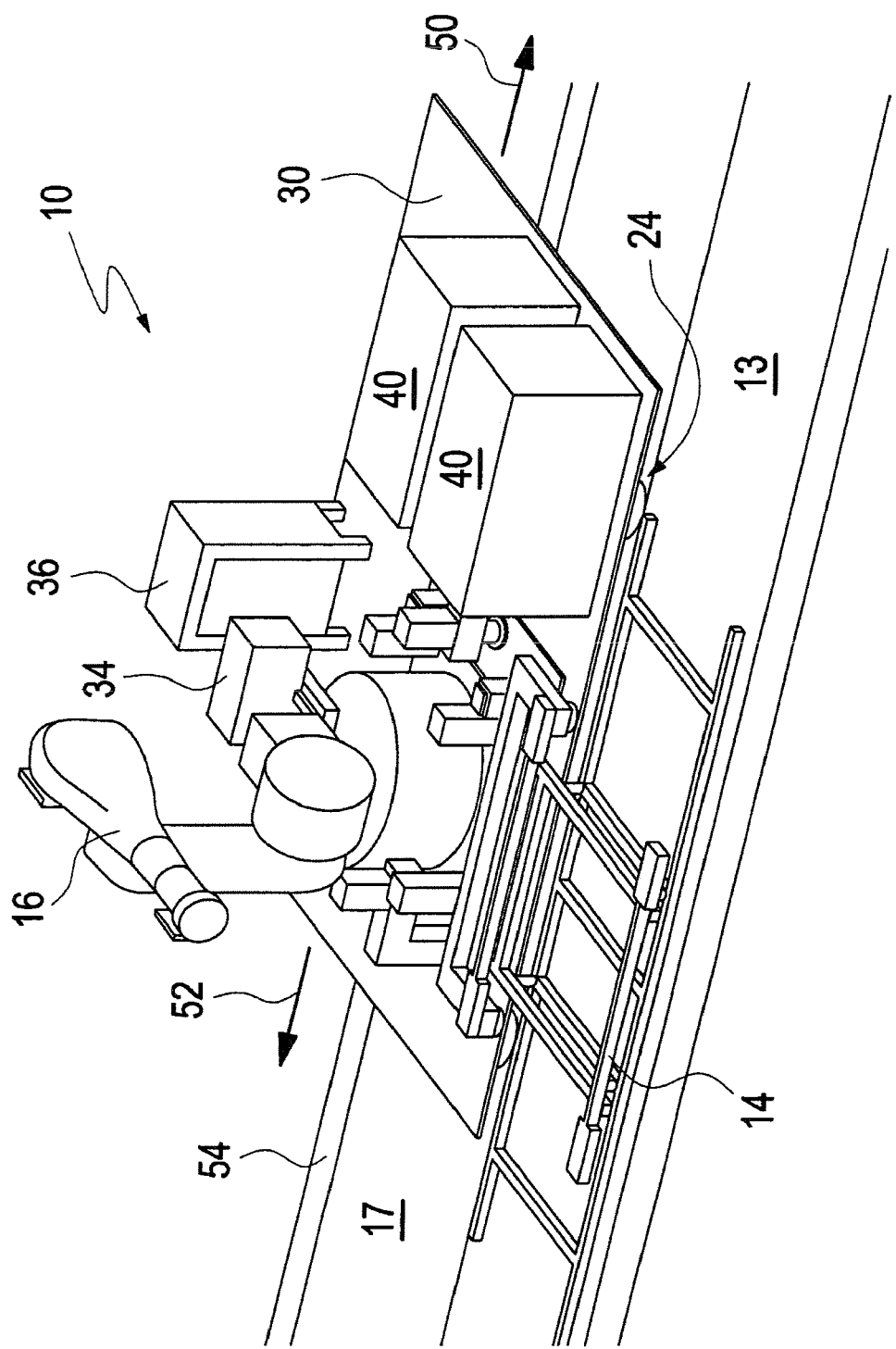
Figure 7:
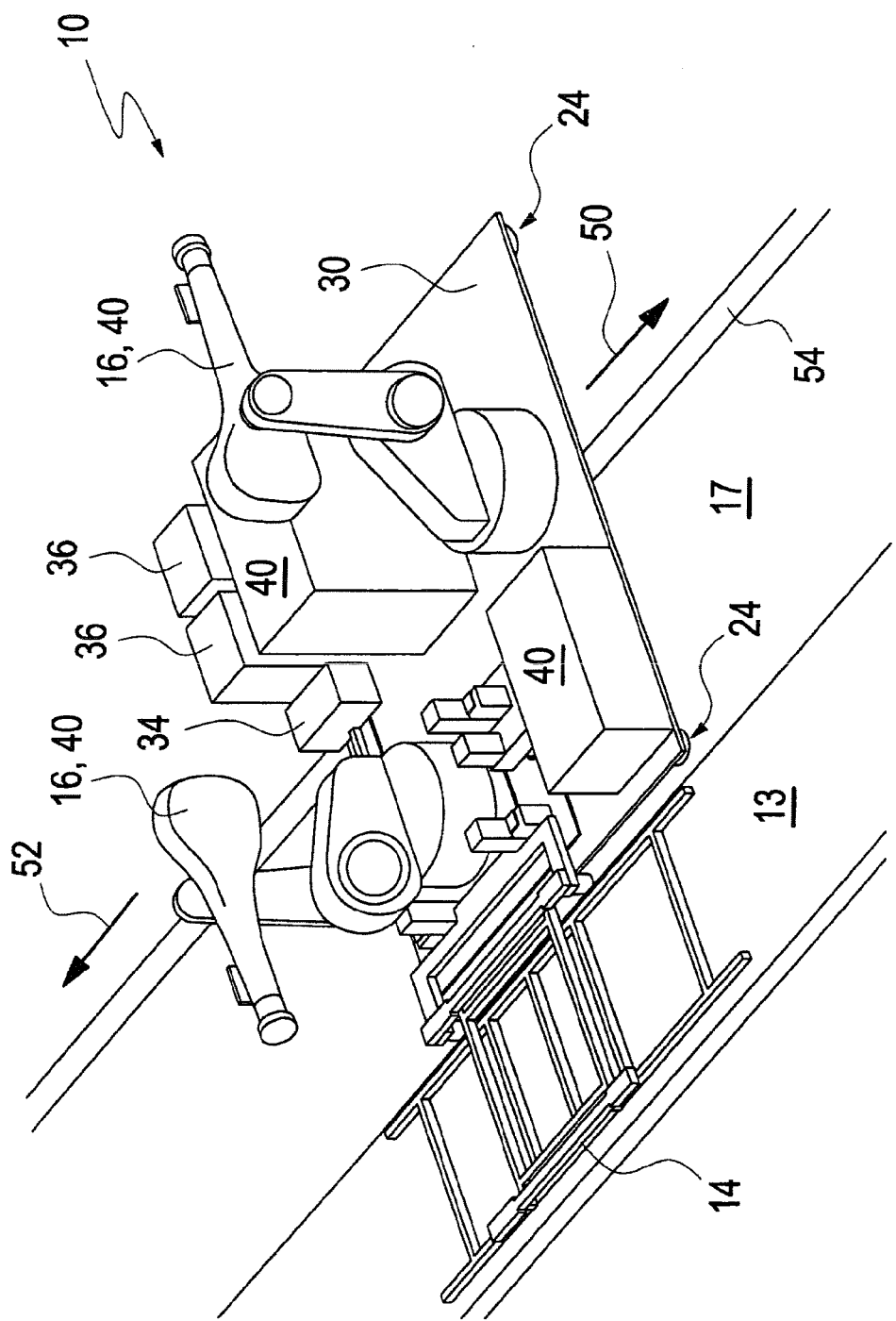

The invention is explained more fully with reference to a plurality of preferred exemplary embodiments and a schematic drawing, wherein:

FIG. 1 shows a schematic top view of a processing system 10 according to the invention, FIGS. 2 to 5 each show a schematic, perspective representation of a part of the processing system of FIG. 1, in enlarged scale, FIGS. 6 and 7 each show a schematic, perspective representation of the processing system according to the invention, according to two further, alternative embodiments.

According to FIG. 1, the processing system 10 includes a workpiece conveyor way 13, on which workpieces 12, being, according to the exemplary embodiment represented, vehicle bodies to be processed, are conveyed along a processing line in the direction of the arrow 48. Further, the processing system 10 includes an industrial robot conveyor way 17, on which an industrial robot 16 can be moved according to the arrows 50, 52.

The vehicle body 12, which can be, for example, a body shell, is carried in a positionally defined manner by a workpiece carrier unit 14, also termed an adapter device, and moved on the workpiece conveyor way 13 according to arrow 48. The industrial robot 16 is arranged on a carrier device 18 that can be moved on the industrial robot conveyor way 17, according to the arrows 50, 52, independently of the vehicle body 12, or of the workpiece carrier unit 14, by means of a drive unit 20. The processing system 10 serves to process the moving vehicle body 12 by means of the industrial robot 16. For this purpose, the industrial robot 16 can be rigidly coupled, intermittently, to the moving vehicle body 12 and/or to the moving workpiece carrier unit 14. The processing system 10 is represented in such a coupled operating position 44 in FIG. 1.

FIG. 2 shows a schematic rear view of the carrier device 18 carrying the industrial robot 16 on the sub-floor 11 of the industrial robot conveyor way 17. The industrial robot 16 is carried by the carrier device 18 via an interposed floating bearing system 22. The floating bearing system 22 includes a first carrier plate 62, to which the industrial robot 16 is rigidly connected. The first carrier plate 62, in turn, is connected to a second carrier plate 64 of the floating bearing system 22 via interposed height compensation systems 46 and a plurality of guide units 60. The height compensation systems 46 can be realized as adjustable cylinder systems, by means of which a wanted height adjustment of the first carrier plate 62 in relation to the second carrier plate 64, and thereby an in particular self-acting height compensation of the industrial robot 16 in relation to the second carrier plate 64, according to the double arrow 56, is possible during the coupling phase. The second carrier plate 64 is connected to a platform 30 of the carrier device 18, via an interposed air cushion system 32, in such a way that a rotatory tolerance compensation in the form of a tumbling motion of the second carrier plate 64, and therefore also of the industrial robot 16, according to the double arrow 58, is possible, in particular in the coupled operating position 44. The platform 30 of the carrier device 18 is supported in relation to the sub-floor 11 of the industrial robot conveyor way 17, by means of a floating carrier unit 24 in the form of an air cushion unit 26, in such a way that it is possible for the platform 30, with the floating bearing system 22 and the industrial robot 16, to move with reduced friction on the industrial robot conveyor way 17 according to the arrows 50, 52. A coupling device 66, which is represented in greater detail in FIGS. 3 to 5 and explained more fully in the following, is connected to the first carrier plate 62.

According to FIGS. 3 to 5, the coupling device 66 includes a coupling frame 68 and a coupling arm 70. The coupling device 66 is connected to the first carrier plate 62 by means of a floating bearing unit 72, in particular in the form of a plurality of bellows cylinders. The floating bearing unit 72 can be activated in dependence on a respective operating position, namely, a decoupled operating position 42 (see FIG. 4) and a coupled operating position 44 (see FIG. 5). For the purpose of effecting a connection of the coupling device 66 to the moving workpiece carrier unit 14, the coupling device 66 has a connection system 84 provided with a plurality of centering elements 78 on the coupling frame 68. In addition, a connection of the coupling device 66 to the moving vehicle body 12 can be effected by means of a gripping system 80 arranged on the coupling arm 70. In the case of the exemplary embodiment represented according to FIG. 5, the gripping system 80 serves to effect a rigid connection of the coupling device 66 to the B-pillar 82 of the vehicle body 12. In order to ensure an operationally favorable and positionally precise coupling of the coupling device 66 to the vehicle body 12, or to the workpiece carrier unit 14, the coupling device 66 has, on its coupling frame 68, a light barrier system 74 and a stop system 76 in the form of a stop cylinder with dampers.

According to FIGS. 6 and 7, which show two alternative embodiments of the processing system 10 in addition to the processing system 10 described above, the industrial robot 16 and/or the first carrier plate 62 and/or the second carrier plate 64 is/are provided with a weight compensation unit 34. The weight compensation unit 34 in this case can be realized in such a way that it includes appropriately movable and, in particular, appropriately displaceable compensation weights. If appropriate, compensating cylinder systems and/or compensating shock absorbers can also be provided for the purpose of appropriate weight compensation of the industrial robot 16 moving during the processing of the vehicle body 12. One or more control units 36 and/or one or more production units 40 can be arranged on the platform 30. The production unit 40 can be one or more industrial robots (see FIG. 7) and/or one more load carriers (see FIGS. 6, 7) and/or one or more processing units (see FIG. 7). If appropriate, the production unit 40 can be realized as an exchangeable and/or expandable module.

According to FIGS. 5 to 7, the processing system 10 includes a guidance system 54, in particular in the form of a guide rail, the guidance system 54 ensuring a directionally defined movement of the carrier device 18, or of the platform 30, according to the arrows 50, 52. The movement of the platform 30 is realized by the drive unit 20, which is realized, for example, as a friction wheel system that is in operative, active contact, switchably if appropriate, with the guide system 54, and enables the platform 30 to move independently of a workpiece, according to the arrows 50, 52, along the guidance system 54 on the industrial robot conveyor way 17.

The functioning of the processing system 10 for processing the vehicle body 12 is described in the following. While a vehicle body 12 is being moved on the workpiece conveyor way 13 according to arrow 48 (see FIG. 1) by means of the workpiece carrier unit 14, the carrier device 18, with the industrial robot 16, is in a decoupled operating position 42 (see FIG. 3) and, in particular, in a position on the industrial robot conveyor way 17 that is at a distance in the direction of workpiece conveyance (arrow 48). The industrial robot 16 must therefore be moved, in the direction of arrow 50, on the industrial robot conveyor way 17 by means of a movement of the workpiece carrier unit 14 in order that it can be positioned in a defined coupling region relative to the moving vehicle body 12. For this purpose, the first carrier plate 62, and therefore also the coupling device 66, is first raised to a predefined stop height for the stop system 76 by means of the height compensation system 46. The stop system 76 is then swiveled out of a passive position (see FIG. 3) into a defined active position (see FIG. 4). By means of the drive unit 20 and the floating carrier unit 24, and following release of any brakes present, the platform 30 can now be accelerated and moved with low friction on the industrial robot way 17, according to arrow 50, in the direction of the moving vehicle body 12, until the coupling device 66 reaches the position according to FIG. 4. Upon position-dependent activation of the light barrier system 74, the approach speed of the platform 30 is reduced automatically in order to ensure a smooth positioning of the coupling device 66 relative to the workpiece carrier unit 14. For this purpose, the light barrier system 74 of the coupling device 66 acts in combination with the workpiece carrier unit 14. The platform 30 is moved further relative to the moving vehicle body 12 in the direction of conveyance (arrow 50), until the stop system 76, which likewise acts in combination with the workpiece carrier unit 14, has reached a defined stop position. Up to this instant, movement of the platform 30 along the guidance system 54 has been effected, independently of a workpiece, by means of the drive unit 20.

The stop position that has now been assumed ensures an exactly concurrent movement of the platform 30 and of the workpiece carrier unit 14 in the direction of conveyance (arrows 50, 48). The floating bearing unit 72 (see FIG. 3) can now be activated in such a way that the coupling frame 68 can be inserted, by means of the centering elements 78, into the workpiece carrier unit 14 correspondingly provided with appropriate receivers, forming a positionally defined, positive connection. If appropriate, a positive locking can be effected in addition between the coupling frame 68 and the workpiece carrier unit 14. Further, a rigid connection between the coupling arm 70 and the B-pillar 82 of the vehicle body 12 is now created through activation of the gripping system 80. In this operating phase, the coupling device 66 is mounted in a floating manner in respect of the first carrier plate 62, and thus in respect of the industrial robot 16, by means of the floating bearing unit 72. The height compensation system 46 is then switched from an operating position that is rigid in the direction of the double arrow 56 (see FIG. 2) to a floating operating position, such that a Z compensation is possible, to compensate tolerance fluctuations between the first carrier plate 62, and thus also of the industrial robot 16, and the coupling device 66. Now, at the latest, the air cushion system 32 is also activated in such a way that a floating mounting of the second carrier plate 64 relative to the platform 30 is realized. The floating bearing unit 72 is now activated in such a way that a rigid coupling is effected between the coupling device 66 and the first carrier plate 62, and thus also of the industrial robot 16, assuring at the same time the aforementioned Z compensation and an angular-position compensation of the first carrier plate 62 (see FIG. 2, double arrow 58). Owing to the acting air cushion system 32 and the height compensation system 46, even minimal movements of the vehicle body 12 can be transferred directly, and with relatively little force, to the first carrier plate 62 and thereby to the industrial robot 16. The active weight compensation unit 34 of the industrial robot 16 ensures a weight compensation of the moving industrial robot 16 that has a favorable effect on the processing of the vehicle body 12.

All coupling steps can thus be effected on the moving body 12. After the coupled operating position 44 (see FIG. 5) has been established, the carrier device 18, by means of the floating bearing system 22 and by overcoming relatively low frictional forces, is concomitantly moved on the sub-floor 11 by the movement of the vehicle body 12 and by the corresponding movement of the workpiece carrier unit 14. The carrier device 18 is thus dragged concomitantly with the moving vehicle body 12 and the moving workpiece carrier unit 14, the drive unit 20, which possibly had been switched on and also switched off in the interim, now no longer acting upon the carrier device 18 in an actively driving manner.

The vehicle body 12 can now be processed with reproducible precision and in a flexible manner by means of the processing system 10 as it is being conveyed along the workpiece conveyor way 13. There is now no need for locked conveyor-way sections and buffering courses along the processing line. Automated and, in particular, fully automated, processing operations can be integrated with the conveyance process. Possible areas of application for the processing system 10 are, for example, fitting of insulation mats by means of adhesive bonding, fitting of the suspension struts, fitting of the window glass, installing a spare or emergency wheel and/or fitting the battery. If appropriate, further, preparatory work can also be performed on the vehicle body 12 and/or on mounted-on parts by the processing system 10 at the same time during the direct processing of the vehicle body 12.

The processing system 10 can be realized in such a way that it is possible to approach the vehicle body 12, or the workpiece carrier unit 14, from the rear in the direction of conveyance (see FIG. 1, arrow 48) of the vehicle body 12, and also from the front, contrary to the direction of conveyance of the vehicle body 12. For this process, the processing system 10, with the stop system 76 in the passive position (see FIG. 3), should be able to travel past the workpiece carrier unit 14 without stop contact.

The invention claimed is:

1. A processing system (10) for processing a moving workpiece (12) by means of an industrial robot (16) that can be rigidly coupled, intermittently, to the workpiece (12) and/or to a movable workpiece carrier unit (14), the industrial robot (16), when in a decoupled operating position (42), being carried by a carrier device (18) that is movable, independently of a workpiece, by means of a drive unit (20) acting with active drive, and, when in a coupled operating position (44), being floatingly mounted relative to the carrier device (18) by means of a floating bearing system (22), wherein, in a coupled operating position (44) of the industrial robot (16), the drive unit (20) does not act with active drive upon the carrier device (18) and the carrier device (18) is moved concomitantly, at least intermittently, by the moving workpiece (12) and/or by the moving workpiece carrier unit (14), by means of the floating bearing system (22).

2. The processing system as claimed in claim 1, wherein the carrier device (18) has a floating carrier unit (24) for moving the industrial robot (16) with reduced friction.

3. The processing system as claimed in claim 2, wherein the floating carrier unit (24) is an air cushion unit (26).

4. The processing system as claimed in claim 1, wherein the drive unit (20) is a friction wheel system which is connected or connectable to a guidance system (54) provided for the carrier device (18).

5. The processing system as claimed in claim 1, wherein the carrier device (18) has a platform (30), to which the industrial robot (16) is rigidly connected when in a decoupled operating position (42) and is floatingly connected when in a coupled operating position.

6. The processing system as claimed in claim 5, wherein the industrial robot (16) is connected to the platform (30) via an interposed height compensation system (46).

7. The processing system as claimed in claim 5, wherein the platform (30) is carried by the floating carrier unit (24) with reduced motional force.

8. The processing system as claimed in claim 5, wherein the industrial robot (16), when in a coupled operating position (44), is floatingly connected to the platform (30) by means of an air cushion system (32).

9. The processing system as claimed in claim 1, wherein the industrial robot (16) has a weight compensation unit (34), which, in dependence on a movement of the industrial robot (16), can be brought into an appropriate compensating position by means of a control unit (36) of the industrial robot (16).

10. The processing system as claimed in claim 1, wherein a control unit (36) of the industrial robot (16) and/or at least one production unit (40) is/are additionally arranged on the carrier device (18).

11. The processing system as claimed in claim 10, wherein the production unit (40) is a further industrial robot and/or a load carrier and/or a processing unit.

12. The processing system as claimed in claim 10, wherein the production unit (40) is an exchangeable and/or expandable module.

13. The processing system as claimed in claim 1, wherein the carrier device (18) is exchangeable and/or expandable module.

14. The processing system as claimed in claim 1, wherein it includes a coupling device (66) coupled to the industrial robot (16) by means of a floating bearing unit (72) that can be activated.

15. The processing system as claimed in claim 14, wherein, in the coupled operating position (44), the coupling device (66) is connected to the industrial robot (16) in a motionally rigid manner and, in the decoupled operating position (42), is floatingly connected thereto.

16. The processing system as claimed in claim 14, wherein the coupling device (66) has a connection system (84) for effecting a connection to the moving workpiece carrier unit (14) and has a gripping system (80) for effecting a connection to the moving workpiece (12).

17. A method for positioning an industrial robot (16) of a processing system (10) as claimed in claim 1, which industrial robot (16) can be rigidly coupled, intermittently, to a movable workpiece (12) and/or to a movable workpiece carrier unit (14), the processing system (10) having a carrier device (18) that is movable, independently of a workpiece, by means of a drive unit (20) and that carries the industrial robot

(16) in the decoupled operating state (42), wherein, in the coupled operating state (44), the industrial robot (16) moved concomitantly by the moving workpiece moves the carrier device (18) concomitantly, at least intermittently, by means of a floating bearing system (22), the carrier device (18) being movable on the sub-floor (11) with reduced motional friction by means of a floating carrier unit (24).

18. The method as claimed in claim 17, wherein the floating bearing system (22) is an air cushion system (32) and the floating carrier unit (24) is an air cushion unit (26).

19. The method as claimed in claim 17, wherein the carrier device (18) is movable in a directionally defined manner on the sub-floor (11) by means of a guidance system (38).

20. The method as claimed in claim 17, wherein the industrial robot (16) is rigidly connected to the carrier device (18), the carrier device (18) is then moved into a coupling position relative to the workpiece (12), a coupling device (66) that is floatingly connected to the industrial robot (16) is then coupled to the workpiece (12) and/or to the workpiece carrier unit (14), the industrial robot (16) is then floatingly connected to the carrier device (18), the coupled coupling device (66) is then rigidly connected to the industrial robot (16) and, upon a workpiece movement (48), the carrier device (18) is then moved concomitantly by means of the floating bearing system (22) of the industrial robot (16).

21. The method as claimed in claim 20, wherein the workpiece (12) is moved at the instant of coupling of the coupling device (66).

* * * * *